Jan. 27, 1970   W. M. PALMER ET AL   3,491,405
APPARATUS FOR PRODUCING TEXTILE FILAMENTS
AND YARNS BY MELT EXTRUSION
Filed May 17, 1965   3 Sheets-Sheet 1
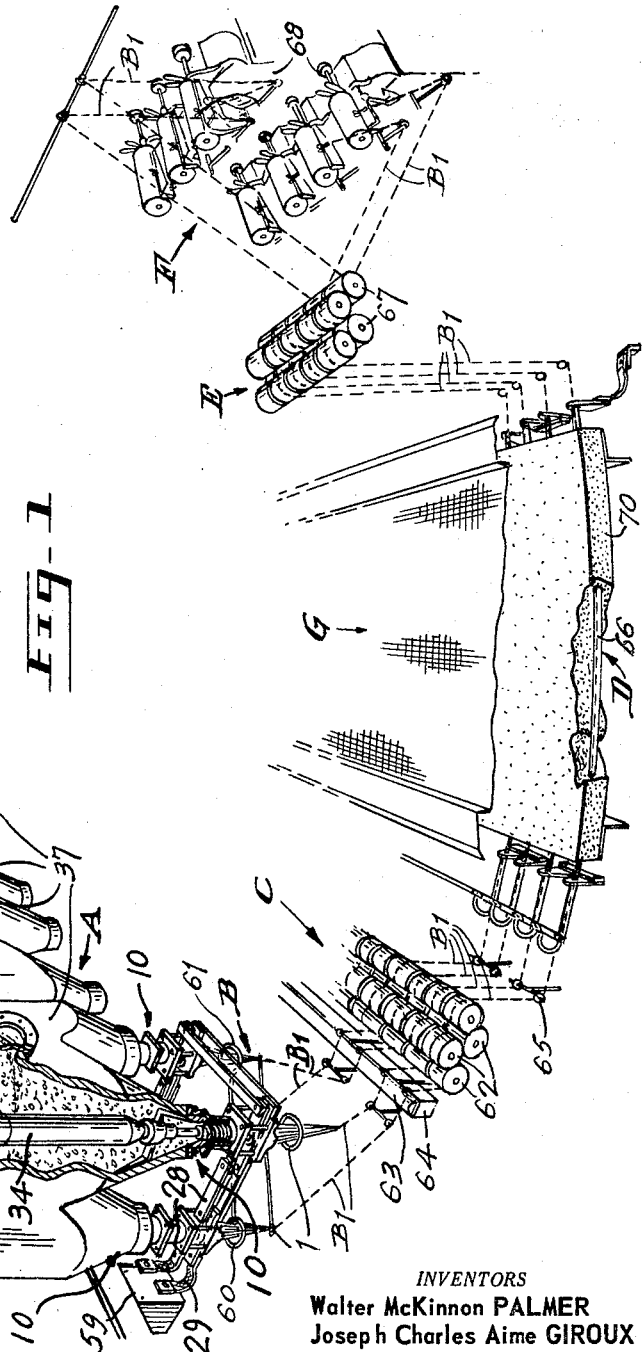
INVENTORS
Walter McKinnon PALMER
Joseph Charles Aime GIROUX
Richard SPEAK
ATTORNEY

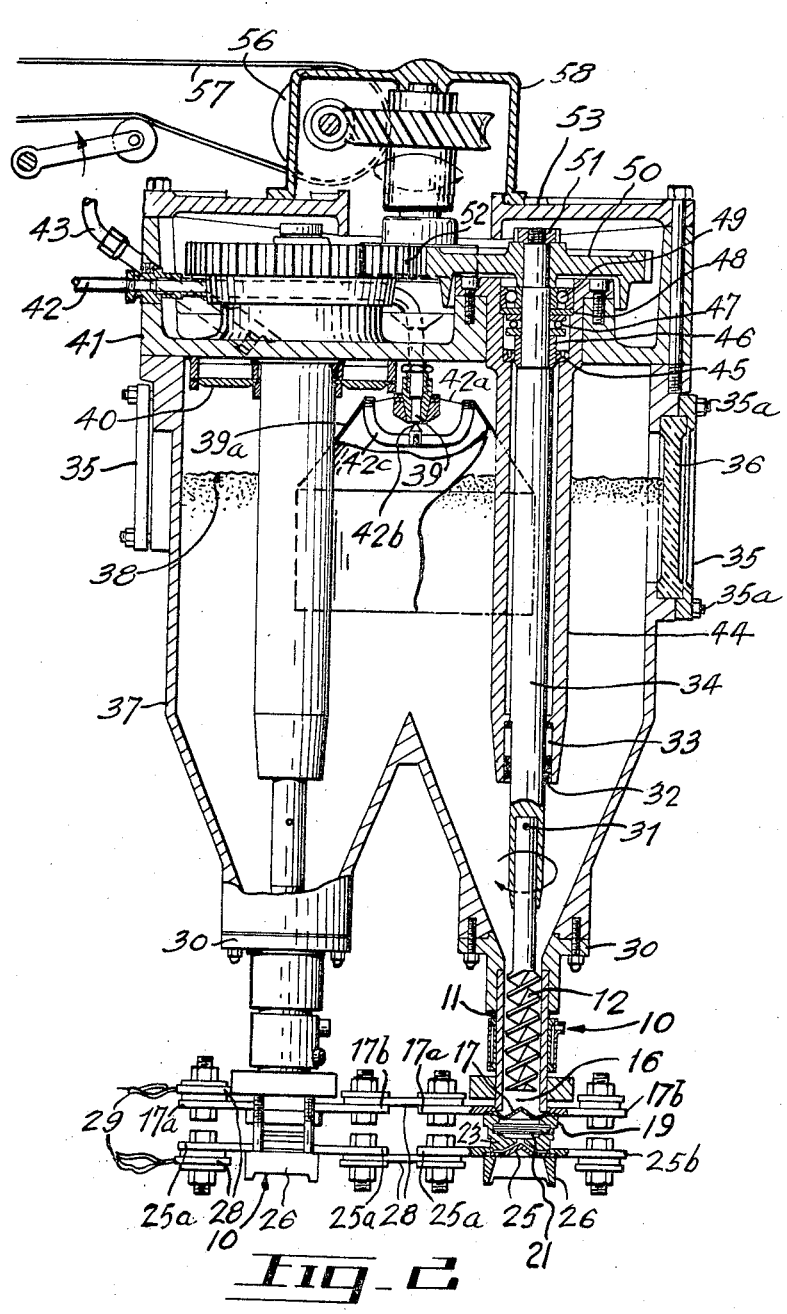

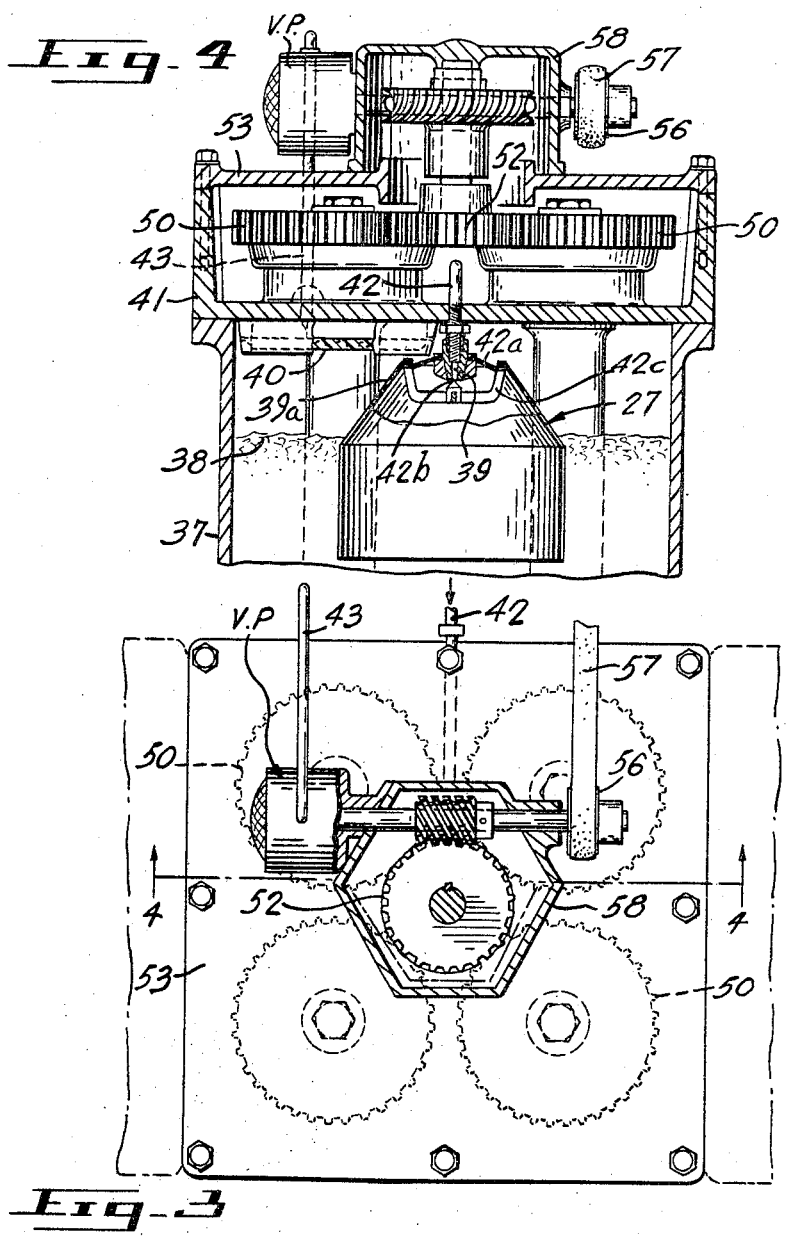

United States Patent Office 3,491,405
Patented Jan. 27, 1970

3,491,405
APPARATUS FOR PRODUCING TEXTILE FILAMENTS AND YARNS BY MELT EXTRUSION
Walter M. Palmer, Lambert, Quebec, and Joseph Charles Aime Giroux and Richard Speak, Drummondville, Quebec, Canada, assignors to Chemcell Limited-Chemcell Limitee, Montreal, Quebec, Canada
Filed May 17, 1965, Ser. No. 456,156
Int. Cl. D01d 5/08
U.S. Cl. 18—8                 6 Claims

ABSTRACT OF THE DISCLOSURE

This disclosure relates to a melt spinning apparatus with a plurality of vertically oriented extrusion screws driven by a common drive means.

---

This invention relates to apparatus for producing textile filaments and yarns by melt extrusion.

Techniques for melt extruding thermoplastic materials are in wide commercial use. However, in the manufacture of fine filaments for textile purposes, particularly from polyolefins, polyesters, polyacetals, and polyamides, many problems are encountered which have not yet been solved.

The fibres must be strong requiring the use of medium to high molecular weight polymers which have a high melt viscosity and which are viscous and sticky in the molten state. The filaments should be elastic and resilient and this limits the use of heat stabilizers, plasticizers or softeners to assist extrusion. Filaments should be uniform enough in diameter to be used in the form of continuous filament yarns. Denier regularity and colour must be suitable for woven and knitted fabrics.

The melt viscosity problem may be reduced by increasing the extrusion temperature, but to a very limited extent, because excess temperatures lead to polymer degradation and discolouration. Many polymers need a light "stabilizer" to prevent degradation when exposed to visible or ultraviolet light but such stabilizers are usually heat sensitive themselves and thus reduce the heat resistance of the mix. Fine filaments are much more vulnerable to ultraviolet degradation than coarser materials such as monofils.

Existing methods are inadequate for one or more of the following reasons:

One method consists of melting the thermoplastic material above a heated grid from which it collects in a molten pool below the grid and thence into the inlet of a metering pump which forces it through the spinnerette. The melting is carried out in an inert atmosphere because of the decomposition which takes place during the extended time that the material is held in the molten pool and in the pipes leading to the metering pumps. Thus the process is unsuitable for producing continuous filaments from thermosensitive materials.

Another method employs a horizontal helical screw type pressure conveyor fed from a hopper on its inlet end and leading to a cylindrical barrel equipped with heating jackets or external electrical band heaters. The heaters must be separated into zones along the length of the barrel, each with its individual temperature control so that the thermoplastic material is gradually heated, compressed and finally melted as it is conveyed from the inlet end to the discharge end. This type of equipment is capable of delivering large quantities of molten material at high pressures and is extensively used in the plastics industry for extruding a great variety of materials for many purposes. In order to obtain equivalent weight of production of fine filaments from a given extrusion apparatus, the speed of draw-down and take-up must be proportionally faster. The use of faster take-up speeds makes it more difficult to control the quality of the filaments and the take-up devices are more expensive. Even with take-up speeds of several thousand feet per minute the output of fine denier yarn in pounds per hour is very low.

Because of the high cost of the extrusion screw with all its auxiliary equipment, it is economically unattractive to operate with only one metering pump per screw. This introduces the problem of manifolding a number of metering pumps all supplied from one extrusion screw. The number of metering pumps which can be fed from one extrusion screw is limited by the path length that the polymer can travel without degrading or discolouring, making it necessary to employ a multiplicity of extrusion screws each equipped with a system of manifolds and metering pumps. Each system must be equipped with expensive apparatus for control of temperature of the various zones of the extrusion screws, manifolds and metering pumps, and means for controlling the speed of the extrusion screw and synchronizing with the metering pumps.

Some polymers such as polypropylene and polyethylene, when used for textile fibres, require additives mixed with the powder (stabilizers) to prevent ultraviolet decomposition and certain pigments, etc., which melt at a temperature lower than the polymer itself. Despite the fact that the extrusion screw acts as a pump, it is not positive in action. The low melting additives stick to the screw and barrel while the polymer is still in the powder state, thus interfering with the uniform movement of the material through the barrel and increasing the tendency towards variations in temperature, pressure and viscosity at the outlet. These variations are not entirely overcome by the metering pump, hence the difficulty of producing a completely uniform product by this method.

Because of the multiplicity of temperature controls, screws, pumps and drives, and the necessity for accurate control, this method is expensive in initial cost, expensive in maintenance cost and requires excessive labour and time for cleaning when changing the colour or changing to a different type of polymer. The thermosensitive polymer is maintained too long in contact with the heated surfaces and too long in the molten state during its passage through the extrusion screw, manifolds, metering pumps and spinnerette, thus causing decomposition, degradation of product and blockage of the jet by decomposition products. Air mixed with the powder becomes compressed by the extrusion screw and, together with water vapour and gaseous products of decomposition, forms "bubbles" at the spinnerette which prohibits the production of fine continuous filaments unless the air, vapour and gaseous products are removed. Although means have been devised for removing these gases this further increases the cost and complexity of the equipment.

Other methods of melt spinning known to the applicants suffer from one or more of the disadvantages described above.

APPLICANTS' DEVELOPMENT

Applicants have now developed a yarn producing process which permits slower yarn extrusion speeds than heretofore possible, while at the same time enabling a reasonable production rate of fine denier, commercially marketable yarn to be maintained.

The yarn is continuously melt-extruded in the form of a plurality of filaments through perforated jets and, by means of a first feed device, the filaments are converged to form yarn having the requisite number of filaments. The yarn is then passed through elongated and contoured passages, each having a heated, elongated, bounding surface across which the yarn is drawn. A further feed device pulls the yarn through the heated passages, the further feed device pulling the yarn at a higher speed than the yarn is fed to the passages by the first mentioned feed device so that the yarn is stretched during the time that it is within the passages. Preferably, the second feed device operates at not less than about one and one-half times the speed at which the yarn is fed by the first feed device.

Having thus generally described the nature of the invention, it will be explained in more detail by reference to the accompanying drawings, showing preferred embodiments, and in which:

FIGURE 1 is a perspective view partly in section showing a battery of multiple screw extruding devices in combination with draw-down rolls, heated stretching tubes and winding mechanism to package the yarn.

FIGURE 2 is a vertical cross-section of one of the multi-screw extruding devices shown in FIGURE 1.

FIGURE 3 is a plan view of the device of FIGURE 2.

FIGURE 4 is a vertical cross-section on the line 4—4 of FIGURE 3.

GENERAL ARRANGEMENT

Referring firstly to FIGURE 1, A represents a battery of multiple screw extruding devices to which finely divided, thermoplastic filament forming material is fed and from which the material is extruded in the form of filaments. B generally represents a construction for guiding the filaments together to form yarn. C represents a draw-down unit which takes up the filaments coming from the extruding devices. D is a heating and stretching unit including a battery of tubes through which the yarn passes. E represents a group of stretching rolls and F represents machines for winding or packaging onto bobbins the yarn delivered from the stretching rolls E.

EXTRUDING DEVICES

Each extruding device (FIGURE 2) consists of a hopper 37 which has a plurality of rotatable spindles 34 therein. At the lower end of each spindle there is a rotatable screw 12 each of which forms part of an extruding head generally indicated at 10. As will be seen from FIGURE 1 four heads 10 are provided for each hopper 37. In principle, the structure of the extruding heads 10 is disclosed in U.S. Patent No. 3,078,509 issued Feb. 26, 1963 and the detailed structure of the heads 10 is disclosed by Canadian patent application Ser. No. 871,454 filed Mar. 21, 1963 by Killoran et al. Consequently, only a general description of the construction and operation of the heads 10 will be undertaken here with reference to FIGURE 2.

Each screw 12 is within a cooled barrel 11, the lower end of which terminates adjacent a melting diaphragm 17 and each diaphragm 17 is connected to a source of electrical current by way of terminals 17a and 17b. Suitably placed insulating washers (not shown) serve electrically to insulate the melting diaphragms 17 from the barrels 11 and from retaining collars 19. According to a modified construction the melting diaphragm can be conduction heated by a circular band heater surrounding the diaphragm 17. Beneath each diaphragm 17 is disposed a filter pack generally indicated at 21, the filter packs 21 being supported from beneath by a member 23. A spinnerette 25 is disposed below each support 23 and is provided with electrical terminals 25a and 25b. The spinnerettes 25 are suitably electrically insulated. The spinnerette 25 can, in a manner similar to the diaphragm 17, be heated by conduction from a circular band heater surrounding the spinnerette 25. If desired, a single band heater can be arranged to heat both the spinnerette and the diaphragm. A yoke 26 supports each spinnerette 25. Electrical transformers generally indicated at 59 are provided for supplying heating current to the diaphragms 17 and the spinnerettes 25.

Leads 29 connect the transformer 59 to busbars 28 which are so arranged that all four diaphragms 17 associated with one hopper 37 are connected in series. Further busbars 28 connect the spinnerettes 25 in series. This structure can clearly be seen from FIGURE 1.

The current flowing through the spinnerettes 25 and the diaphragms 17 can be controlled manually by conventional regulating devices (not shown). The spinnerettes 25, and the diaphragms 17, being connected in series, require only a single power control device for the spinnerettes and a single power control device for the diaphragms 17.

Each screw 12 serves to withdraw powder from the associated hopper 37 and form solid plugs of powder in the zones referenced 16 in FIGURE 2. These plugs are constantly forced against one of the diaphragms 17, melted, and forced through the diaphragm, the plugs continually being replenished by the screw 12 from the hopper 37.

The filaments, after extrusion, are cooled to the proper temperature for draw-down by an air jet (not shown). The filaments are then converged into yarn B1 by a ring-like thread guides 61. Draw-down is accomplished by a system of conventional draw rolls 62 forming the draw-down unit C. Before contacting the rolls 62, the yarn B1 runs over a lubricating roller 63 which rotates partially submerged in a lubricating substance contained in a trough 64.

From the draw-down rolls 62, the yarn B1 passes through a system of thread guides 65 and into the inlet end of a bank of electrically heated, curved stretched tubes 66. These stretch tubes are disclossed in the applicants' Canadian patent application Ser. No. 823,809 (Killoran et al.) filed May 18, 1961. The stretching of the yarn B1 is accomplished by the tension imparted by stretch rolls 67 which are identical in design to the draw-down rolls 62 but are driven at a higher rate of speed depending upon the ratio of stretch required.

After stretching, the yarn B1 is taken up and packaged by means of conventional winding and packaging machines 68. The heated tubes 66 are embedded in a layer of insulation 70. This insulation and the tubes can be suitably located beneath a floor G intervening the draw-down rolls 62 and the stretch rolls 67.

MULTI-SCREW EXTRUDING DEVICE

Reverting now to the extruding devices of the appa ratus, each barrel 11 is mounted below the associated one of the multiple hoppers 37 by means of a steel adaptor casting 30 (FIGURE 2). A drive pin 31 is passed through a bore in the upper end of the screw 12, and connects the screw 12 to one of the drive spindles 34. A conventional vacuum seal 32 prevents the entrance of air around the spindle 34. The spindle 34 is rotatably mounted in a housing 44 by means of a radical ball bearing 49 and a needle roller bearing 33. The thrust of the pressure screw 12, which may range from about 500 to about 2000 pounds per square inch of barrel cross-section, is counteracted by a thrust ball bearing 47. An observation window 36, sealed into the side of the housing by means of gaskets (not shown) and clamped in place by a retaining ring 35 and bolts 35a, permits a visual check of the powder level in hopper 37. A preferred powder level is indicated at 38.

AUTOMATIC POWDER LEVEL CONTROL

An automatic powder level control device is indicated at 27 (FIGURE 4). This device is made up of a bell-shaped dome 39a, preferably of transparent plastic, and having an air-tight top enclosure sealed to a powder inlet tube 42 by means of a flexible diaphragm 42a and carrying on its underside a cone-shaped plug 42b, supported by four arms 42c. The plug 42b is centered in the mouth 39, of the powder inlet tube 42, so that the upward movement of the dome 39a closes the mouth of the tube 42.

When no forces are acting on the dome 39a, the mouth 39 is open as the dome 39a drops under gravity. In operation, air is evacuated from the hopper 37 through a vacuum pipe 43 by a vacuum pump V.P. (FIGURE 1). A plurality of hoppers are preferably all connected to the same vacuum pump. The powder supply tube 42 is connected to powder supply tank (not shown). The removal of air from the hopper 37 creates a partial vacuum. This, in turn, causes a mixture of air and powder to flow from the powder supply tank through the open mouth 39 until the dome 39a is largely submerged in the powder thus causing a resistance to the flow of air which has to pass down around the skirt of the dome 39a and then up through the accumulated powder.

The resistance thus created causes a pressure differential between the inside and outside of the dome 39a. Since the pressure is lower on the outside than on the inside, and since the dome 39a is suspended by a flexible diaphragm, its weight is overcome, causing it to lift. As the dome 39a lifts, the plug 42b is carried into the mouth 39 of the powder inlet tube 42 thereby stopping the flow of powder and air. The dome 39a is supported in this position by the powder itself.

As powder is removed slowly from the bottom of the hopper 37 by the screws 12, the powder level drops carrying the dome down with it and thereby re-opening the mouth 39 and re-starting the flow of air and powder. In actual practice, the powder level remains nearly constant and the mouth 39 opens and closes periodically thus admitting a small quantity of powder in accordance with the rate of extrusion. The air which enters with the powder is immediately evacuated through the pipe 43 so that the full vacuum of the system is maintained in the hopper.

The vacuum pipe 43 connects through a cast iron gear casing 41 and enters the hopper at one side. The mouth of this vacuum pipe is covered by a flexible filter 40 of sponge rubber or other suitable material to prevent dust from the powder entering the vacuum system. This filter, being flexible, can be cleaned by permitting a small amount of air to enter through the vacuum pipe 43. A conventional oil seal 45, for example, a Garlock Klosure, is provided to prevent oil from the gear casing and the bearings from finding its way into the annular space between the spindle 34 and the spindle housing 44.

DRIVE ARRANGEMENT

A thrust sleeve 46 is provided to transmit thrust from the shoulder of the spindle 34 to the thrust bearing 47. A thrust washer 48 is provided to transmit thrust from the thrust bearing 47 to the outer race of the radial bearing 49 and thence to an internal snap ring at the top of the housing 44.

A preferred drive arrangement includes the four spindles 34 each driven by a gear 50 keyed to it and grouped around a central drive pinion 52. Lock nuts 51 are provided to locate the gear 50 on the spindle 34. The cast iron gear casing 41 is of oil-tight construction and contains an oil bath for lubricating the drive gears and a cover 53 on which is mounted the drive arrangements for the pinion 52.

As shown in FIGURE 1, a multiplicity of hoppers 37 may all be mounted on one frame and the spindles 34 of these hoppers all driven at the same speed from a common shaft 54 via pulleys 55, belt 57 and pulleys 56. The latter, in turn, drive the worms of worm gear speed reducers 58. A slow speed shaft of each worm gear speed reducer 58 extends downwardly through the cover 53, its lower end carrying, keyed to it, one of the pinions 52.

OPERATION

From the description it will be clear than an apparatus is provided which enables finely divided synthetic thermoplastic filament-forming material to be fed in at one end and finished yarn of desired characteristics to be packaged at the other end. Between an automatically controlled powder feed device and the yarn packaging device, the material undergoes the continuous steps of compacting into a solid body, melting the leading end of the solid body, drawing off the melted end in the form of filaments, solidifying the filaments and collecting them into yarn, drawing-down the yarn by means of draw-down rolls, passing the yarn through a heating zone in which it is subjected to softening temperature, taking up the yarn on stretch rolls which are driven at a faster speed than the draw-down rolls, thereby stretching the yarn while it is in softened condition, and packaging the yarn on winding machines.

VARIABLE FACTORS

A conventional extruder has a screw length about 24 times the internal diameter of the barrel. A one and one-quarter inch diameter barrel would have to be approximately 30 inches long. It would have to be equipped with heaters throughout its length and preferably with cooling blowers to remove heat and control temperatures at the various stages of compression and extrusion. The applicants' extruder, in contrast, with a preferred size of barrel for textile use of one and one-quarter inches diameter requires a screw and barrel approximately only 5 inches long.

The conventional extruder is satisfactory for use in the plastics industry where it is required to extrude large quantities of material in injection moulding and similar uses. The applicants' extruder is particularly designed for use in the textile industry, where a great multiplicity of small size extruding devices are preferred. It lends itself to a combination in which filaments are formed and subsequently treated in a continuous operation with the extruding to form finished yarn of predetermined characteristics. The relatively low extrusion speed, as compared with the large commercial extruder generally used, is compensated for by synchronization of the extruding mechanism with the subsequent heating-stretching mechanism, so that the total performance of the combination is most economical.

More specifically, the applicants have approached the problem of melt spinning without attempting to adopt the standard extrusion screw used in the plastics industry. They have found by experimentation that it is possible by means of a short helical double flight screw rotating in a short vertical barrel, of preferred length not more than 5", to compact the thermoplastic materials into a solid plug and force said plug continually against an electrically heated perforated diaphragm which abuts the lower end of the barrel, so that the leading face of the plug is continuously melted and the molten polymer immediately and continuously flows through the perforations into a sealed chamber below, which contains a filter and a spinnerette.

Contrary to the extrusion systems of the prior art, the applicants' barrel is surrounded by a water cooling jacket which carries away heat which may be conducted up from the heated diaphragm through the walls of the barrel. The degree of cooling is not critical and is accomplished simply by circulating a small amount of water at ambient temperature, thus maintaining the screw, barrel and powder at a temperature below the melting point of the lowest melting additive. In this way all contact of the molten material with the moving parts is completely avoided and the residence time of the polymer in the molten condition is kept to a minimum. The solid plug of thermoplastic material between the lower end of the screw and the melting diaphragm forms an air-tight seal so that the feed hopper above may be maintained under vacuum, thus eliminating air and moisture from the powdered material and freeing it from oxidizing atmosphere before it reaches the temperature at which it would decompose.

The pressure screw and barrel combination described above can produce the required pressure for compacting, melting, filtering and extrusion. The spinnerette which is heated in the same manner is of the same general design as the melting diaphragm, but is larger in diameter to accommodate a larger number of holes in accordance with the number of filaments required in the yarn which may range up to 500 or more. The amount of heating current flowing through each is independently adjustable so as to maintain the melting diaphragm at the optimum temperature for melting and the spinnerette at the correct temperature for extrusion.

A multiplicity of these devices, which are manufactured to close tolerances and are therefore interchangeable, can be connected to a single hopper or a series of multiple hoppers all driven at exactly the same speed from a common drive with all the melting diaphragms connected in series from one adjustable source of electrical current and all the spinnerettes connected in series on another separately adjustable source so as to produce a multiplicity of multifilament yarns of uniform denier and physical properties within commercial tolerances. Once set, all conditions of screw speed, melting current and spinnerette current are maintained constant thus eliminating the need for expensive automatic control equipment and at the same time providing precise control of temperature at the melting diaphragm and spinnerette. These heating devices, being in series and being calibrated to identical resistance, develop the same amount of heat which ensures uniformity of the product, namely, warp quality pigmented yarns.

By maintaining the hopper under vacuum and by means of the powder level control device, the supply of powder in the hopper is continually replenished, thus making possible a truly continuous process.

The following examples illustrate the capabilities of the apparatus of the present invention.

EXAMPLE 1

The apparatus was used to melt extrude continuous filament polypropylene yarns for textile applications. All processing steps were combined in one continuous operation for a much reduced requirement of processing labour while maintaining yarn quality.

The hoppers were automatically fed with a polypropylene resin of a 12 melt index, as measured by ASTM Method D-1238-57T, in flake form with a particle size such that 90% had passed a 16 U.S. mesh size and only 5% had been retained by a 200 U.S. mesh size. Other particle sizes were tolerable although for good yarn uniformity the particle sizes specified were preferred.

The melt temperature was 255° C. but according to the resin grade used or the yarn properties desirable for specific end uses the melt temperature could have been in the range of 230 to 280° C.

Each spinnerette 25 had 50 holes.

The extrusion debit was 8 grams per minute per spinnerette although depending on desirable yarn properties, a debit in the range of 4 to 45 grams per minute per spinnerette was possible.

Draw-down and stretch rolls were operated at 50 and 375 feet per minute respectively, giving a machine stretch ratio of 7.5. According to required yarn properties, processing speeds of these rolls were possible for stretch ratios anywhere in the range of 1.5 to 10.

The stretching tubes temperature was 125° C. In dependance on the specific yarn properties required, it is possible to adjust the temperature of the stretching tubes anywhere between 30° C. up to a temperature slightly lower than the temperature at which, for a specific resin, fusion of the filaments reaches an objectionable level.

The extruded and stretched yarns measured 625 denier with 50 filaments. The physical properties were 7.5 grams per denier and 23% elongation. The machine conditions were adjustable for any yarn denier in the range of 10 denier to 10,000 denier with tenacities from 1.5 to 10 grams per denier and elongations from 15 to 600 percent.

EXAMPLE 2

The hoppers were fed with a polyamide resin nylon 6, semi-dull, in pellet form. The other processing conditions and yarn properties were as follows:

| | |
|---|---|
| Extrusion temperature, ° C. | 250 |
| Extrusion debit, gms./minute/spinnerette | 15 |
| Number of holes per spinnerette | 50 |
| Draw roll speed, ft./min. | 140 |
| Stretch roll speed, ft./min. | 600 |
| Stretching tube temperature, ° C. | 110 |
| Denier | 800 |
| Tenacity, gms./d. | 4.5 |
| Elongation, percent | 30 |

A wide range of yarn properties was possible with different machine adjustments as mentioned in Example 1.

EXAMPLE 3

The hoppers were fed with a polyacetal resin in flake form having a melt index of 2.5. The other processing conditions and yarn properties were as follows:

| | |
|---|---|
| Extrusion temperature, ° C. | 215 |
| Extrusion debit, gms./minute/spinnerette | 9 |
| Number of holes per spinnerette | 75 |
| Draw roll speed, ft./min. | 50 |
| Stretch roll speed, ft./min. | 262 |
| Stretching tube temperature, ° C. | 145 |
| Denier | 1260 |
| Tenacity, g./d. | 5.3 |
| Elongation, percent | 20 |

A wide range of yarn properties was possible with different machine adjustments as mentioned in Example 1.

EXAMPLE 4

Because of the low extrusion speeds the short residence time in molten form inherent to this apparatus, it was possible to adjust processing conditions at a given debit, particularly air quenching and extrusion tension conditions, in order to develop after relaxation, along each individual filament, a helical crimp of the type necessary for a bulk continuous filament yarn. In a preferred arrangement for a bulk yarn effect the processing conditions were as follows:

| | |
|---|---|
| Resin | (1) |
| Melt index | 3 |
| Extrusion temperature, ° C. | 265 |
| Extrusion debit, g./minute/spinnerette | 7.5 |
| Number of holes per spinnerette | 75 |
| Extrusion tension, g. | 90 |
| Draw roll speed, ft./min. | 65 |
| Stretching tube temperature, ° C. | 30 |
| Stretch roll speed, ft./min. | 195 |
| Denier on delivery package | 1200 |
| Tenacity, gms./d. | 2.5 |
| Elongation, percent | 100 |

[1] Polypropylene in flake form blended with stabilizer and pigments for a beige colour.

When this yarn was left in a relaxed form for an appreciable length of time at room temperature or left for a few minutes in a relaxed form in an oven at 140° C. it shrunk and developed a helical crimp in each filament. The final relaxed properties of this yarn were as follows:

| | |
|---|---|
| Relaxed denier | 1600. |
| Type of crimp | 3-dimensional helical. |
| Crimp frequency | 10 to 15 crimps per inch. |

EXAMPLE 5

The hoppers were fed with a polyacetal resin in flake from having a melt index of 2.5. The processing conditions were adjusted according to this particular resin for a bulk yarn effect as follows:

| | |
|---|---|
| Extrusion temperature, ° C. | 202 |
| Extrusion debit, gms./minute/spinnerette | 9 |
| Number of holes per spinnerette | 75 |
| Extrusion tension, gms. | 41 |
| Draw roll speed, ft./min. | 35 |
| Stretch roll speed, ft./min. | 84 |
| Stretching tube temperature, ° C. | 30 |
| Denier on delivery package | 1400 |

When this yarn was left in a relaxed form for an appreciable length of time at room temperature or left for a few minutes in a relaxed form in an oven at 95° C. or better still left in a relaxed form for a few seconds in water at 98° C., it shrunk and developed a helical crimp in each filament. The final relaxed properties were as follows:

| | |
|---|---|
| Relaxed Denier | 2500. |
| Type of crimp | 3-dimensional helical. |
| Crimp frequency | 8 to 12 crimps/inch. |

EXAMPLE 6

The hoppers were fed with a polypropylene resin in flake form having a melt index of 2 to 4. This resin had been preblended with stabilizer and pigments for a biege colour. The processing conditions were adjusted according to this particular resin for a bulk effect as follows:

| | |
|---|---|
| Extrusion temperature, ° C. | 265 |
| Extrusion debit, gms./minute/spinnerette | 11 |
| Number of holes per spinnerette | 100 |
| Extrusion tension per spinnerette, gms. | 90 |
| Draw roll speed, ft./min. | 125 |
| Stretching tube temperature, ° C. | 30 |
| Stretch roll speed, ft./min. | 375 |

The stretched yarns from all headers were collected together in a tow form and fed through an additional roll mechanism to a staple cutter. When this staple had been left in a relaxed form for an apreciable length of time at room temperature or heated in an oven for a few minutes in a relaxed form at 140° C., it shrunk and developed a helical crimp. The final relaxed properties of this staple were as follows:

| | |
|---|---|
| Filament denier | 14. |
| Type of crimp | 3-dimensional helical. |
| Crimp frequency | 10 to 15 crimps/inch. |

This staple when previously cut to the proper length was suitable for staple yarn processing according to the cotton or the woolen or any other spun yarn system without any aditional crimping requirements.

Among the advantages achieved by the applicants' method and apparatus are the following:

(1) The residence time of the polymer in the heated apparatus is kept to a minimum.

(2) The temperature of the melt is accurately controlled so that it does not at any point during its passage through the apparatus reach the degradation temperature.

(3) The flow of polymer through the apparatus is streamlined so that there is no stagnation or slow movement of any part of the mix.

(4) The sticky molten polymer is never allowed to touch a moving part such as a screw, piston, or gear.

(5) Air and moisture are excluded from the powder before it is fed to the extrusion screw and before it is heated.

(6) The apparatus is capable of producing a large number of yarns in a limited floor space.

(7) The apparatus as a ninety-six-spinnerette unit capable of operating at 4× 24 gives greater flexibility of programming, particularly with respect to colour, than could be achieved from the same outlay on conventional extruders.

(8) The molten material is delivered to the spinnerette, free from harmful bubble-forming gas or other decomposition products without the use of metering pumps or inert gas.

(9) Because each extrusion unit is much smaller, simpler and less expensive than conventional melt extrusion machines it is possible to use much slower yarn extrusion speeds which facilitate the operation and control of filament quality, structure and cross-section.

We claim:

1. An apparatus for melt spinning thermosplastic material to form filaments comprising a hopper adapted to receive a mass of finely divided thermoplastic material to be extruded, said hopper having a plurality of individual tapered, feeding channels each leading to an extruding head, a screwfed device in each extruding tube and having a shaft extending upwardly through said hopper, a header at the top of said hopper, each shaft extending into said header and having a gear mounted thereon, a common drive gear meshing with each of the gears mounted on said shafts, means extending upwardly from said common gear beyond said header and connecting with a speed reducer, means for driving said speed reducer thereby to transmit drive to said shafts whereby all said shafts are driven simultaneously, common take-up means adapted to take up the filaments from all of the spinnerettes, and means for driving said take-up means of the apparatus in unison with the extruding means whereby the filaments are extruded, collected into yarn and taken up uniformly from each of the spinnerettes.

2. An apparatus for producing filaments comprising:
 (a) a plurality of hoppers each formed with channels extending downwardly whereby finely divided synthetic plastic material fed into the hopper feeds under gravity into said channels;
 (b) feed means for urging synthetic plastics material downwardly through said channels;
 (c) an extruding head at the lower end of each channel for extruding a plurality of filaments, material being fed to each extruding head by the associated feed means;
 (d) heating means at each extruding head for melting the plastics material prior to extrusion;
 (e) mechanical drive means interconnecting said feed means of one hopper with the feed means of other hoppers whereby all said feed means can be driven from a common source; and
 (f) take-up means for the filaments whereby the filaments emanating from all the extruding heads are taken up at the same speed.

3. An apparatus for producing filaments comprising:
 (a) a plurality of hoppers each formed with channels extending downwardly whereby finely divided synthetic plastic material fed into the hopper feeds under gravity into said channels;
 (b) feed means for urging synthetic plastics material downwardly through said channel;
 (c) an extruding head at the lower end of each channel for extruding a plurality of filaments, material being fed to each extruding head by the associated feed means;
 (d) heating means at each extruding head for melting the plastics material prior to extrusion;
 (e) a header at the upper end of each hopper;
 (f) mechanical means on each header connected with the feed means of the associated hopper for transmitting drive to said feed means;
 (g) transmission means interconnecting said mechanical means with common drive source means; and
 (h) take-up means for the filaments whereby the filaments emanating from all the extruding heads are taken up at the same speed.

4. A device for producing filaments, comprising a plurality of hoppers for containing finely divided thermoplastic material, each hopper having a plurality of gravity fed, tapering channels, a plurality of feeding devices for feeding material downwardly through said channels, interconnected means within each hopper for driving the plurality of feeding devices at the same speed, means for feeding finely divided thermoplastic material to each hopper, control means for such material feeding means responsive to the upper level of the thermoplastic material within the hopper for keeping said material at a substantially even upper level, means for feeding inert gas to each hopper, drive connections from outside each hopper to said interconnected means, a common drive source coupled to each of said drive connections for simultaneously driving each of said feeding devices for melt extruding a plurality of filaments, means associated with each extruding head for melting the thermoplastic material adjacent thereo, the operation of said feeding devices resulting in molten material being forced through said extruding heads whereby material is continuously melt extruded to form filaments of substantially the same diameter, and means for collecting from each head the filaments having substantially the same characteristics.

5. A device for producing yarn, comprising a hopper for containing finely divided firmer plastic material, said hopper including a reservoir part for containing a supply of finely divided material and a plurality of gravity fed channels extending downwardly from the reservoir part, a yarn extruding head at the lower end of each channel for extruding a plurality of yarn filaments, screws in said channels for feeding two said extruding heads material entering said channels under the action of gravity, drive transmitting means in the upper part of said hopper driving the connecting said screws, and a common drive source operatively connected to said drive transmitting means whereby all said screws are driven synchronously from the same drive source.

6. A device according to claim 5, in which each screw is at the lower end of a drive spindle and in which each drive spindle carries a driven gear at the upper end thereof, there being a single, common drive gear meshing with said driven gears.

References Cited
UNITED STATES PATENTS

| | | |
|---|---|---|
| 1,546,155 | 7/1925 | Wadsworth. |
| 2,898,628 | 8/1959 | Phipps. |
| 2,953,428 | 9/1960 | Hunt et al. |
| 3,281,899 | 11/1966 | Dacco. |
| 3,294,503 | 12/1966 | Machlan et al. |
| 3,354,504 | 11/1967 | Lehner. |

WILBUR L. McBAY, Primary Examiner

U.S. Cl. X.R.

18—12